United States Patent [19]

Kitaoh et al.

[11] Patent Number: 5,156,405
[45] Date of Patent: * Oct. 20, 1992

[54] GOLF BALL

[75] Inventors: Katsutoshi Kitaoh, Takarazuka; Mikio Yamada, Kobe; Akihiko Hamada, Kakogawa, all of Japan

[73] Assignee: Sumitomo Rubber Industries, Ltd., Hyogo, Japan

[*] Notice: The portion of the term of this patent subsequent to Dec. 20, 2007 has been disclaimed.

[21] Appl. No.: 242,611

[22] Filed: Sep. 9, 1988

[30] Foreign Application Priority Data

Sep. 10, 1987 [JP] Japan .................. 62-227479

[51] Int. Cl.$^5$ ............................................. A63B 37/12
[52] U.S. Cl. .................. 273/235 A; 273/DIG. 24; 273/DIG. 22
[58] Field of Search ........... 273/235 R, 235 A, 235 B, 273/DIG. 24, 62, 213, 219, 233, 234, DIG. 22; 40/327

[56] References Cited

U.S. PATENT DOCUMENTS

| 4,679,795 | 7/1987 | Melvin et al. | 273/235 R |
| 4,798,386 | 1/1989 | Berard | 273/DIG. 24 |
| 4,802,674 | 2/1989 | Kitaoh | 273/235 A |

Primary Examiner—George J. Marlo
Attorney, Agent, or Firm—Birch, Stewart, Kolasch & Birch

[57] ABSTRACT

A golf ball comprising a core, a cover, and a clear paint outer layer. The cover comprises 100 parts by weight of an ionomer resin, a light stabilizer and an ultraviolet (UV) absorber such that the total amount of the light stabilizer and the UV absorber is present in an amount of 0.1 to 5 parts by weight based on 100 parts by weight of the cover resin and an amount ratio of the light stabilizer / the UV absorber is from 75/25 to 25/75. The clear paint comprises a light stabilizer and a UV absorber in an amount of 0.1 to 20 parts by weight based on 100 parts by weight of the paint solid and an amount ratio of the light stabilizer / the UV absorber of 75/25 to 5/95. The clear paint further comprises a fluorescent whitening agent in an amount of 0.04 to 1.6 parts by weight based on 100 parts weight of the paint solid.

13 Claims, 1 Drawing Sheet

GOLF BALL

FIELD OF THE INVENTION

The present invention relates to a golf ball of which a cover and a paint on the cover have excellent durability.

BACKGROUND OF THE INVENTION

Recently a golf ball is desired to have excellent white appearance. Japanese Kokai Patent 40071/1985 discloses a method wherein a fluorescent whitening agent is formulated into a white cover of the golf ball to enhance whiteness degree. According to the above method, the golf ball which has a high whiteness degree, brightness and transparency is obtained without having a white enamel paint layer on its white cover. However, the golf ball thus obtained is deteriorated after weathering exposure, particularly in paint adhesion and a delamination of a paint layer often occurs. It has been found that, since the golf ball is coated by only a clear paint and has no opacifying coating, ultraviolet is passed through the clear paint layer to reach the surface of the cover and deteriorate it, thus the adhesion between a clear paint and a cover being severely deteriorated. Accordingly, actual available golf balls have an enamel paint layer which exhibit opacifying power to ultraviolet rays to prevent the decline of the cover.

SUMMARY OF THE INVENTION

The present invention provides a golf ball which does not have an enamel paint layer but has a clear paint layer in which a fluorescent whitening agent is formulated. The golf ball has excellent appearance and color tone as well as whitening effect. The golf ball also includes a light stabilizer and UV absorber to inhibit the deterioration of durability and resistance to ultraviolet light.

The present invention provides a golf ball comprising a ball body which is composed of a core and a cover, and a clear paint layer coated on the ball body, the improvement being in that the cover comprises 100 parts by weight of a cover resin, a light stabilizer and an ultraviolet (UV) absorber such that the total amount of the light stabilizer and the UV absorber is present in an amount of 0.1 to 5 parts by weight, preferably 0.1 to 2 parts by weight based on 100 parts by weight of the cover resin and an amount ratio of the light stabilizer/the UV absorber is from 75/25 to 25/75, the clear paint comprises a light stabilizer and a UV absorber in an amount of both of 0.1 to 20 parts by weight, preferably 0.2 to 10 parts by weight based on 100 parts by weight of the paint solid and the amount ratio of the light stabilizer/the UV absorber is from 75/25 to 5/95, preferably 75/25 to 10/90, and the clear paint further comprises an fluorescent whitening agent in an amount of 0.04 to 1.6 parts by weight based on 100 parts weight of the paint solid. In this case, the clear paint layer is severely deteriorated by UV and therefore lacks weather-resistance when the light stabilizer and UV absorber is not formulated into the clear paint but formulated only into the cover. In addition a color tone of an appearance is deteriorated when the light stabilizer and UV absorber are formulated only in the clear paint.

DETAILED DESCRIPTION OF THE INVENTION

Figure 1:
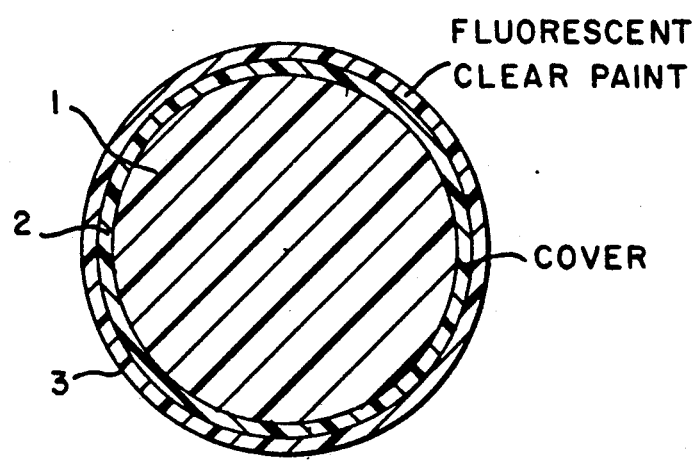
FIG. 1 is a sectional view showing a golf ball of the present invention.

The light stabilizer utilized for the present invention is generally hindered amines. Examples of the light stabilizers include bis(2,2,6,6-tetramethyl-4-piperidyl)-sebacate and bis(1,2,2,6,6-pentamethyl-4-piperidyl)sebacate. Representative examples of such light stabilizers are SANOL LS 770 and SANOL LS765 available from Sankyo Co. Ltd.

The UV absorber is a chemical which absorbs or intercepts ultraviolet light to protect from the deterioration of a resin and the like. Examples of the UV absorbers include salicylic acid derivatives, benzophenones, benzotriazoles, substituted acrylonitriles, nickel complexes and the like. The preferred UV absorbers can be Tinuvin 900 available from Chiba-Geigy Co. and Uvinul N-35 available from BASF.

Even if the weight ratio of the light stabilizer to the UV absorber in the cover satisfies the claimed range, the total amounts of them of less than 0.1 parts by weight, do not obtain the improvement of weather-resistance. When the total amount is more than 5 parts by weight, the color tone of the cover becomes indistinct and an appearance of the cover becomes poor. If the weight ratio is outside the range of 75/25 to 25/75, its weather resistance is inferior.

Even if the weight ratio of the light stabilizer to the UV absorber in the clear paint satisfies the claimed range, the total amounts of them of less than 0.1 parts by weight, do not obtain the improvement of weather-resistance. When the total amount is more than 20 parts by weight, the color tone of the clear paint becomes indistinct and an appearance of the cover becomes poor. If the weight ratio is outside the range of 75/25 to 5/95, its weather resistance is inferior.

The fluorescent whitening agent is a chemical which changes ultraviolet to a visible light (blue light). Examples of the fluorescent whitening agents include Hostalux KCB from Hext Japan, Leucopur EGM from Sandoz Phorwhite K-2002 from Mobay Chemical Corporation and whitefluor B, HCS and PCS from Sumitomo Chemical Co. Ltd, and the like. The preferred fluorescent whitening agent can be used as Ubitex OB available from The Chiba-Geigy Chemical Co. and whitefluor HCS available from Sumitomo Chemical Co. Ltd,. The clear paint contains 0.04 to 1.6 parts by weight, preferably 0.08 to 0.4 parts by weight of an fluorescent whitening based on 100 parts by weight of a solid content of a paint. In the case of less than 0.04 parts by weight, the brightness is not enough. In the case of more than 1.6 parts by weight, the fluorescent whitening agent itself becomes yellow and results in the decline of paint properties.

FIG. 1 is a sectional view showing a golf ball of the present invention.

The cover material 2 used in the present invention may be a resin which has good moldability, toughness and durability. Generally an ionomer resin can be employed as suitable resin. The ionomer resin is a thermoplastic resin which is prepared by polymerizing 96 to 70% by weight of a mono-olefin with 4 to 30% by weight of at least of one monomer selected from the class comprising unsaturated mono- or di-carboxylic acids having 3 to 8 carbon atoms and esters thereof, followed by crosslinking through a metal atom. Such as ionomer resin utilized may be Himiran which is available from Mitsui Dupon't Poly-Chemical Company. As above mentioned, a light stabilizer, an ultraviolet absorber and another optional additive such as titanium oxide, precipitated barium sulfate and zinc sulfide may be formulated in the cover, but a fluorescent whitening agent is not be formulated.

The method of covering the core with a cover 2 is not limited, but may be prepared by covering the core by two semi-spherical covers and molding with heat and pressure. It may be prepared by injection-molding the core with the cover. The core 1 in the embodiment of the present invention 1 may be anyone, for example a solid core integrally formed from butadiene rubber or a wound core. The solid core may contain two or more layers. The method of forming these cores is known by one skilled in the art.

The cover 2 mentioned above is coated with a clear paint 3 thereon. Various clear paints may be employed, but urethane or epoxy thermosetting clear paints are preferred. The thickness of the clear paint layer is preferably 20 μm to 50 μm. In order to obtain its thickness, the clear paint is coated twice to some times, preferably three times. The clear paint may contain the light stabilizer, the ultraviolet absorber, the fluorescent whitening agent and another optional additive. It is more effective in weather-resistance and white appearance that the inner clear paint layer contains a larger amount of the light stabilizer and UV absorber and the outer clear paint contains a larger amount of the fluorescent whitening agent. Accordingly, the outer paint layer may only contain the fluorescent whitening agent.

EXAMPLES

The present invention is illustrated by the following examples which, however, are not to be construed as limiting the invention to their details.

EXAMPLES 1 TO 8 AND COMPARATIVE EXAMPLES 1 TO 5

Solid cores containing principally butadiene rubber which were prepared by a conventional method were covered with the cover materials as shown in Table 1 by injection molding. The obtained golf ball was coated with the paints as shown in Table 1. Evaluation was made on appearance i.e. transparence and brightness, paint adhesion after a weather resistance test, yellowing after a weather resistance test. The result of the evaluation is shown in Table 1.

TABLE 1

| charge (parts by weight) | Example 1 | 2 | 3 | 4 | 5 | 6 | 7 | 8 | Comparative Example 1 | 2 | 3 | 4 | 5* |
|---|---|---|---|---|---|---|---|---|---|---|---|---|---|
| Cover Ionomer resin[1] | 100 | 100 | 100 | 100 | 100 | 100 | 100 | 100 | 100 | 100 | 100 | 100 | 100 |
| Light stabilizer[2] | 0.05 | 0.05 | 0.4 | 0.4 | 0.4 | 0.4 | — | — | — | — | — | — | — |
| UV absorber[3] | 0.05 | 0.05 | 0.2 | 0.2 | 0.2 | 0.2 | — | — | — | — | — | — | — |
| Fluorescent whitening[5] | — | — | — | — | — | — | — | — | — | — | — | — | — |
| Titanium dioxide (anatase) | 1 | 1 | 1 | 1 | 1 | 1 | 1 | 1 | 1 | 1 | 1 | 1 | 1 |
| Precipitated barium sulfate | 3 | 3 | 3 | 3 | 3 | 3 | 3 | 3 | — | — | — | — | — |
| Clear or enamel paint (First layer) Urethane resin | 100 | — | 100 | — | 100 | 100 | 100 | 100 | — | 100 | 100 | 100 | 100 |
| Epoxy resin | — | 100 | — | 100 | — | — | — | — | — | — | — | — | — |
| Light stabilizer[6] | 0.2 | — | 1 | 1 | 2 | 1 | 2 | 2 | — | — | — | — | — |
| UV absorber[3] | 0.1 | 0.2 | 2 | — | 2 | 6 | 1 | 18 | — | — | — | — | — |
| UV absorber[4] | — | — | — | 2 | — | — | — | — | — | — | — | — | — |
| UV absorber[7] | — | 0.1 | — | 1 | — | — | — | — | — | — | — | — | — |
| Antioxydant[8] | — | 0.1 | — | — | — | — | — | 5 | — | — | — | 20 | — |
| Fluorescent whitening[5] | 0.2 | 0.2 | 0.2 | 0.2 | 0.2 | 0.2 | 0.2 | 0.2 | 0.2 | 1.6 | 0.2 | — | 1.6 |
| Titanium dioxide | — | — | — | — | — | — | — | — | — | — | — | — | 20 |
| Clear or enamel paint (Second layer) Urethane resin | 100 | 100 | 100 | 100 | 100 | 100 | 100 | 100 | 100 | — | 100 | 100 | 100 |
| Light stabilizer[2] | 0.2 | 0.2 | 2 | 2 | 2 | 2 | 2 | 2 | — | — | — | — | — |
| UV absorber[3] | 0.1 | 0.1 | 1 | 2 | 2 | 2 | 10 | 18 | — | — | — | — | — |
| UV absorber[4] | — | — | — | 1 | — | — | — | — | — | — | — | — | — |
| Antioxydant[8] | 0.1 | 0.1 | — | — | — | — | 0.4 | 5 | — | — | — | — | 1.6 |
| Fluorescent whitening[5] | 0.2 | 0.2 | 0.2 | 0.2 | 0.2 | 0.2 | 0.2 | 0.8 | 0.2 | 1.6 | 0.2 | — | 20 |
| Titanium dioxide | — | — | — | — | — | — | — | — | — | — | — | — | 100 |
| Top coat Urethane resin | 100 | 100 | 100 | 100 | 100 | 100 | 100 | 100 | 100 | 100 | 100 | 100 | 100 |
| Fluorescent whitening[5] | 0.2 | 0.2 | 0.2 | 0.2 | 0.2 | 0.2 | 0.2 | 0.2 | 0.2 | 0.2 | 0.2 | 0.2 | 0.2 |
| Evaluation Appearance[9] (transmittance) | Very good | Very good | Very good | Very good | Very good | Very good | Very good | Very good | Very good | Very good | Very good | Very good | Bad |
| Appearance[10] (brightness) | Very good | Very good | Very good | Very good | Very good | Very good | Very good | Very good | Very good | Very good | Very good | Bad | Very good |
| Yellowing after a weather-resistance test[11] | Very good | Very good | Very good | Very good | Very good | Very good | Very good | Very good | Bad | Bad | Bad | Bad | Very good |
| Adhesion after a weather-resistance test[12] | Good | Very good | Very good | Very good | Very good | Very good | Very good | Very good | Bad | Bad | Fairly good | Very good | Very good |
| Total judgment | Very good | Very good | Very good | Very good | Very good | Very good | Very good | Very good | Bad | Bad | bad | Bad | Bad |

[1] Himiran 1605 available from Mitsui Dupon't Poly-chemical Co.
[2] Sanol LS 770 available from Sankyo Co.
[3] Tinuvin 900 available from Chiba-Geigy Co.
[4] Tinuvin P available from Chiba-Geigy Co.
[5] Ubitex OB available from Chiba-Geigy Co.
[6] Sanol LS 765 available from Sankyo Co.
[7] Uvinul N35 available from BASF.
[8] Irganox 245 available from Chiba-Geigy Co.
[9] Visible observation
[10] Visibly observed and measured by a color difference meter.
[11] Visibly observed and measured by a color difference meter.
[12] After a golf ball was treated in Sunshine Weather-O-Meter for 100 hours, it was impacted 100 times at a speed of 45 m/sec and tested according to the method of JIS K 5400 6.15. After this test, a condition of paint adhesion is observed.

*The test was carried out not with clear but with enameled paint.

EXAMPLE 9 AND COMPARATIVE EXAMPLE 6 AND 7

The present example shows the golf ball which has a cover comprising both a light stabilizer and a UV absorber. Each comparative example shows a golf ball which has a cover comprising either a light stabilizer or a UV absorber. The golf balls were prepared and tested according to the example 1. The result of the evaluation is shown in Table 2.

TABLE 2

| | charge (parts by weight) | Example 9 | Comparative Example 6 | Comparative Example 7 |
|---|---|---|---|---|
| Cover | Ionomer resin | 100 | 100 | 100 |
| | Photostabilizer[2] | 0.4 | — | 0.4 |
| | UV absorber[3] | 0.2 | 0.2 | — |
| | Titanium dioxide (anatase) | 1 | 1 | 1 |
| | Precipitated barium sulfate | 3 | 3 | 3 |
| First clear layer | Urethane resin | 100 | 100 | 100 |
| | Photostabilizer[6] | 2 | 2 | 2 |
| | UV absorber[3] | 2 | 2 | 2 |
| | Fluorescent whitening[5] | 0.2 | 0.2 | 0.2 |
| Second clear layer | Urethane resin | 100 | 100 | 100 |
| | Photostabilizer[2] | 2 | 2 | 2 |
| | UV absorber[3] | 2 | 2 | 2 |
| | Fluorescent whitening[5] | 0.2 | 0.2 | 0.2 |
| Top clear | Urethane resin | 100 | 100 | 100 |
| | Fluorescent whitening[5] | 0.2 | 0.2 | 0.2 |
| Evaluation | Appearance (transmittance) | Very good | Very good | Very good |
| | Appearance (brightness) | Very good | Very good | Very good |

TABLE 2-continued

| | charge (parts by weight) | Example 9 | Comparative Example 6 | Comparative Example 7 |
|---|---|---|---|---|
| | Yellowing after a weather-resistance test | Very good | Very good | Very good |
| | Adhesion after a weather-resistance test | Very good | Bad | Bad |
| | Total judgment | Very good | Bad | Bad |

EXAMPLES 10 AND 11 AND COMPARATIVE EXAMPLES 8 AND 9

The present example shows the golf ball which satisfies the range of 0.1 to 0.5 parts by weight of a light stabilizer and a UV absorber in the cover. The comparative example shows the golf ball which does not satisfy the range of 0.1 to 0.5 parts by weight of a light stabilizer and a UV absorber in the cover. The golf balls were prepared and tested according to the example 1. The result of the evaluation is shown in Table 3.

TABLE 3

| | charge (parts by weight) | Example 10 | Example 11 | Comparative Example 8 | Comparative Example 9 |
|---|---|---|---|---|---|
| Cover | Ionomer resin | 100 | 100 | 100 | 100 |
| | Light stabilizer[2] | 0.06 | 3 | 0.01 | 6 |
| | UV absorber[3] | 0.04 | 2 | 0.005 | 4 |
| | Titanium dioxide (anatase) | 1 | 1 | 1 | 1 |
| | Precipitated barium sulfate | 3 | 3 | 3 | 3 |
| First clear layer | Urethane resin | 100 | 100 | 100 | 100 |
| | Light stabilizer[6] | 2 | 2 | 2 | 2 |
| | UV absorber[3] | 2 | 2 | 2 | 2 |
| | Fluorescent whitening[5] | 0.2 | 0.2 | 0.2 | 0.2 |
| Second clear layer | Urethane resin | 100 | 100 | 100 | 100 |
| | Light stabilizer[2] | 2 | 2 | 2 | 2 |
| | UV absorber[3] | 2 | 2 | 2 | 2 |
| | Fluorescent whitening[5] | 0.2 | 0.2 | 0.2 | 0.2 |
| Top clear | Urethane resin | 100 | 100 | 100 | 100 |
| | Fluorescent whitening[5] | 0.2 | 0.2 | 0.2 | 0.2 |
| Evaluation | Appearance (transmittance) | Very good | Very good | Very good | Very good |
| | Appearance (brightness) | Very good | Very good | Very good | Bad |
| | Yellowing after a weather-resistance test | Very good | Very good | Very good | Very good |
| | Adhesion after a weather-resistance test | Very good | Very good | Bad | Very good |
| | Total judgment | Very good | Very good | Bad | Bad |

EXAMPLES 12 AND 13 AND COMPARATIVE EXAMPLES 10 AND 11

The present example shows the golf ball which satisfies the claimed range of the light stabilizer/the UV absorber in the cover. The comparative example shows that the golf ball which does not satisfy total amount of the claimed range of the light stabilizer/the UV absorber in the cover. The golf balls were prepared and tested according to the example 1. The result of the evaluation is shown in Table 4.

TABLE 4

| | charge (parts by weight) | Example 12 | Example 13 | Comparative Example 10 | Comparative Example 11 |
|---|---|---|---|---|---|
| Cover | Ionomer resin | 100 | 100 | 100 | 100 |
| | Photostabilizer[2] | 0.45 | 0.15 | 0.55 | 0.05 |
| | UV absorber[3] | 0.15 | 0.45 | 0.05 | 0.55 |

TABLE 4-continued

|  | charge (parts by weight) | Example 12 | Example 13 | Comparative Example 10 | Comparative Example 11 |
|---|---|---|---|---|---|
|  | Titanium dioxide (anatase) | 1 | 1 | 1 | 1 |
|  | Precipitated barium sulfate | 3 | 3 | 3 | 3 |
| First clear layer | Urethane resin | 100 | 100 | 100 | 100 |
|  | Photostabilizer[6] | 2 | 2 | 2 | 2 |
|  | UV absorber[3] | 2 | 2 | 2 | 2 |
|  | Fluorescent whitening[5] | 0.2 | 0.2 | 0.2 | 0.2 |
| Second clear layer | Urethane resin | 100 | 100 | 100 | 100 |
|  | Photostabilizer[2] | 2 | 2 | 2 | 2 |
|  | UV absorber[3] | 2 | 2 | 2 | 2 |
|  | Fluorescent whitening[5] | 0.2 | 0.2 | 0.2 | 0.2 |
| Top clear | Urethane resin | 100 | 100 | 100 | 100 |
|  | Fluorescent whitening[5] | 0.2 | 0.2 | 0.2 | 0.2 |
| Evaluation | Appearance (transmittance) | Very good | Very good | Very good | Very good |
|  | Appearance (brightness) | Very good | Very good | Very good | Very good |
|  | Yellowing after a weather-resistance test | Very good | Very good | Very good | Very good |
|  | Adhesion after a weather-resistance test | Very good | Very good | Bad | Bad |
|  | Total judgment | Very good | Very good | Bad | Bad |

EXAMPLES 14 AND COMPARATIVE EXAMPLES 12 AND 13

The present example shows the golf ball which has a clear paint comprising both a light stabilizer and a UV absorber. The each of comparative example shows that the golf ball which has a clear paint comprising either a light stabilizer or a UV absorber. The golf balls were prepared and tested according to the example 1. The result of the evaluation is shown in Table 5.

TABLE 5

|  | charge (parts by weight) | Example 14 | Comparative Example 12 | Comparative Example 13 |
|---|---|---|---|---|
| Cover | Ionomer resin | 100 | 100 | 100 |
|  | Light stabilizer[2] | 0.4 | 0.4 | 0.4 |
|  | UV absorber[3] | 0.2 | 0.2 | 0.2 |
|  | Titanium dioxide (anatase) | 1 | 1 | 1 |
|  | Precipitated barium sulfate | 3 | 3 | 3 |
| First clear layer | Urethane resin | 100 | 100 | 100 |
|  | Light stabilizer[6] | 2 | — | 2 |
|  | UV absorber[3] | 2 | 2 | — |
|  | Fluorescent whitening[5] | 0.2 | 0.2 | 0.2 |
| Second clear layer | Urethane resin | 100 | 100 | 100 |
|  | Light stabilizer[2] | 2 | — | 2 |
|  | UV absorber[3] | 2 | 2 | — |
|  | Fluorescent whitening[5] | 0.2 | 0.2 | 0.2 |
| Top clear | Urethane resin | 100 | 100 | 100 |
|  | Fluorescent whitening[5] | 0.2 | 0.2 | 0.2 |
| Evaluation | Appearance (transmittance) | Very good | Very good | Very good |
|  | Appearance (brightness) | Very good | Very good | Very good |
|  | Yellowing after a weather-resistance test | Very good | Very good | Very good |
|  | Adhesion after a weather-resistance test | Very good | Bad | Bad |
|  | Total judgment | Very good | Bad | Bad |

EXAMPLES 15 AND 16 AND COMPARATIVE EXAMPLES 14 AND 15

The present example shows the golf ball which satisfies the claimed amount range of the light stabilizer and UV absorber in the clear paint. The comparative example shows the golf ball which does not satisfy the claimed amount range of the light stabilizer and UV absorber in the clear paint. The golf balls were prepared and tested according to the example 1. The result of the evaluation is shown in Table 6.

TABLE 6

|  | charge (parts by weight) | Example 15 | Example 16 | Comparative Example 14 | Comparative Example 15 |
|---|---|---|---|---|---|
| Cover | Ionomer resin | 100 | 100 | 100 | 100 |
|  | Light stabilizer[2] | 0.4 | 0.4 | 0.4 | 0.4 |
|  | UV absorber[3] | 0.2 | 0.2 | 0.2 | 0.2 |
|  | Titanium dioxide (anatase) | 1 | 1 | 1 | 1 |
|  | Precipitated barium sulfate | 3 | 3 | 3 | 3 |
| First clear layer | Urethane resin | 100 | 100 | 100 | 100 |
|  | Light stabilizer[6] | 0.05 | 10 | 0.01 | 15 |
|  | UV absorber[3] | 0.05 | 10 | 0.01 | 15 |
|  | Fluorescent whitening[5] | 0.2 | 0.2 | 0.2 | 0.2 |
| Second clear | Urethane resin | 100 | 100 | 100 | 100 |
|  | Light stabilizer[2] | 0.05 | 10 | 0.01 | 15 |

TABLE 6-continued

|  | charge (parts by weight) | Example 15 | Example 16 | Comparative Example 14 | Comparative Example 15 |
|---|---|---|---|---|---|
| layer | UV absorber[3] | 0.05 | 10 | 0.01 | 15 |
|  | Fluorescent whitening[5] | 0.2 | 0.2 | 0.2 | 0.2 |
| Top clear | Urethane resin | 100 | 100 | 100 | 100 |
|  | Fluorescent whitening[5] | 0.2 | 0.2 | 0.2 | 0.2 |
| Evaluation | Appearance (transmittance) | Very good | Very good | Very good | Bad |
|  | Appearance (brightness) | Very good | Very good | Very good | Bad |
|  | Yellowing after a weather-resistance test | Very good | Very good | Very good | Good |
|  | Adhesion after a weather-resistance test | Very good | Very good | Bad | Very good |
|  | Total judgment | Very good | Very good | Bad | Bad |

EXAMPLES 17 AND 18 AND COMPARATIVE EXAMPLES 16 AND 17

The present example shows the golf ball which satisfies the claimed amount range of the light stabilizer/the UV absorber in the clear paint. The comparative example shows the golf ball which does not satisfy the claimed range of the light stabilizer/the UV absorber in the clear paint. The golf balls were prepared and tested according to the example 1. The result of the evaluation is shown in Table 7.

EXAMPLES 19 AND 20 AND COMPARATIVE EXAMPLES 18 TO 20

The present example shows the golf ball which satisfies the claimed amount range of the fluorescent in the clear paint. The comparative example shows the golf ball which does not satisfy the claimed amount range of the fluorescent in the clear paint. The golf balls were prepared and tested according to the example 1. The result of the evaluation is shown in Table 8.

TABLE 7

|  | charge (parts by weight) | Example 17 | Example 18 | Comparative Example 16 | Comparative Example 17 |
|---|---|---|---|---|---|
| Cover | Ionomer resin | 100 | 100 | 100 | 100 |
|  | Light stabilizer[2] | 0.4 | 0.4 | 0.4 | 0.4 |
|  | UV absorber[3] | 0.2 | 0.2 | 0.2 | 0.2 |
|  | Titanium dioxide (anatase) | 1 | 1 | 1 | 1 |
|  | Precipitated barium sulfate | 3 | 3 | 3 | 3 |
| First clear layer | Urethane resin | 100 | 100 | 100 | 100 |
|  | Light stabilizer[6] | 3 | 0.2 | 3.9 | 0.05 |
|  | UV absorber[3] | 1 | 3.8 | 0.1 | 3.95 |
|  | Fluorescent whitening[5] | 0.2 | 0.2 | 0.2 | 0.2 |
| Second clear layer | Urethane resin | 100 | 100 | 100 | 100 |
|  | Light stabilizer[2] | 3 | 1 | 3.9 | 0.05 |
|  | UV absorber[3] | 1 | 3 | 0.1 | 3.95 |
|  | Fluorescent whitening[5] | 0.2 | 0.2 | 0.2 | 0.2 |
| Top clear | Urethane resin | 100 | 100 | 100 | 100 |
|  | Fluorescent whitening[5] | 0.2 | 0.2 | 0.2 | 0.2 |
| Evaluation | Appearance (transmittance) | Very good | Very good | Very good | Very good |
|  | Appearance (brightness) | Very good | Very good | Very good | Very good |
|  | Yellowing after a weather-resistance test | Very good | Very good | Very good | Very good |
|  | Adhesion after a weather-resistance test | Very good | Very good | Bad | Bad |
|  | Total judgment | Very good | Very good | Bad | Bad |

TABLE 8

|  | charge (parts by weight) | Example 19 | Example 20 | Example 18 | Comparative Example 19 | Comparative Example 20 |
|---|---|---|---|---|---|---|
| Cover | Ionomer resin | 100 | 100 | 100 | 100 | 100 |
|  | Light stabilizer[2] | 0.4 | 0.4 | 0.4 | 0.4 | 0.4 |
|  | UV absorber[3] | 0.2 | 0.2 | 0.2 | 0.2 | 0.2 |
|  | Titanium dioxide (anatase) | 1 | 1 | 1 | 1 | 1 |
|  | Precipitated barium sulfate | 3 | 3 | 3 | 3 | 3 |
| First | Urethane resin | 100 | 100 | 100 | 100 | 100 |

TABLE 8-continued

|  | charge (parts by weight) | Example 19 | Example 20 | Example 18 | Comparative Example 19 | Comparative Example 20 |
|---|---|---|---|---|---|---|
| clear layer | Photostabilizer[6] | 2 | 2 | 2 | 2 | 2 |
|  | UV absorber[3] | 2 | 2 | 2 | 2 | 2 |
|  | Fluorescent whitening[5] | 0.04 | 1.6 | — | 0.01 | 3.0 |
| Second clear layer | Urethane resin | 100 | 100 | 100 | 100 | 100 |
|  | Light stabilizer[2] | 2 | 2 | 2 | 2 | 2 |
|  | UV absorber[3] | 2 | 2 | 2 | 2 | 2 |
|  | Fluorescent whitening[5] | 0.04 | 1.6 | — | 0.01 | 3.0 |
| Top clear | Urethane resin | 100 | 100 | 100 | 100 | 100 |
|  | Fluorescent whitening[5] | 0.04 | 1.6 | — | 0.01 | 3.0 |
| Evaluation | Appearance (transmittance) | Very good | Very good | Bad | Fairly good | Very good |
|  | Appearance (brightness) | Very good | Very good | Bad | Bad | Very good |
|  | Yellowing after a weather-resistance test | Very good | Very good | Very good | Very good | Bad |
|  | Adhesion after a weather-resistance test | Very good | Very good | Bad | Bad | Very good |
|  | Total judgment | Very good | Very good | Bad | Bad | Bad |

What is claimed is:

1. A golf ball comprising:
   a ball body which is composed of a core and a cover, and a clear paint layer coated on the ball body,
   wherein said cover comprises 100 parts by weight of a cover resin, a light stabilizer and an ultraviolet (UV) absorber such that the total amount of the light stabilizer and the UV absorber is present in an amount of 0.1 to 5 parts by weight based on 100 parts by weight of the cover resin and the amount ratio of the light stabilizer/the UV absorber is from 75/25 to 25/75, and
   said clear paint layer comprises a light stabilizer and a UV absorber in an amount of both of 0.1 to 20 parts by weight based on 100 parts by weight of the paint solid of said clear paint and the amount ratio of the light stabilizer/the UV absorber is from 75/25 to 5/95, and said clear paint further comprises a fluorescent whitening agent in an amount of 0.04 to 1.6 parts by weight based on 100 parts weight of the paint solid.

2. The golf ball according to claim 1, wherein said cover resin is an ionomer resin.

3. The golf ball according to claim 2, wherein said ionomer resin comprises a thermoplastic resin prepared by polymerizing 96 to 70% by weight of a mono-olefin with 4 to 30% by weight of at least one of a monomer selected from the group consisting of unsaturated mono- or di-carboxylic acids having 3 to 8 carbon atoms and esters thereof, followed by crosslinking through a metal atom.

4. The golf ball according to claim 1, wherein the total amount of the light stabilizer and the UV absorber in the cover is present in an amount of 0.1 to 2 parts by weight based on 100 parts by weight of the cover resin.

5. The golf ball according to claim 4, wherein said clear paint comprises a light stabilizer and a UV absorber in an amount of both of 0.2 to 10 parts by weight based on 100 parts by weight of the paint solid of said clear paint.

6. The golf ball according to claim 5, wherein the amount ratio of the light stabilizer/the UV absorber in said clear paint is from 75/25 to 10/90.

7. The golf ball according to claim 6, wherein said fluorescent whitening agent is present in said clear paint in an amount of 0.08 to 0.4 parts by weight based on 100 parts by weight of the paint solid of said clear paint.

8. The golf ball according to claim 7, wherein said cover resin is an ionomer resin, and wherein said ionomer resin comprises a thermoplastic resin prepared by polymerizing 96 to 70% by weight of a mono-olefin with 4 to 30% by weight of at least one of a monomer selected from the group consisting of unsaturated mono- or di-carboxylic acids having 3 to 8 carbon atoms and esters thereof, followed by crosslinking through a metal atom.

9. The golf ball according to claim 8, wherein said clear paint layer has a thickness of from 20 to 50 μm.

10. The golf ball according to claim 1, wherein said clear paint comprises a light stabilizer and a UV absorber in an amount of both of 0.2 to 10 parts by weight based on 100 parts by weight of the paint solid of said clear paint.

11. The golf ball according to claim 1, wherein the amount ratio of the light stabilizer/the UV absorber in said clear paint is from 75/25 to 10/90.

12. The golf ball according to claim 1, wherein said fluorescent whitening agent is present in said clear paint in an amount of 0.08 to 0.4 parts by weight based on 100 parts by weight of the paint solid of said clear paint.

13. The golf ball according to claim 1, wherein said clear paint layer has a thickness of from 20 to 50 μm.

* * * * *